United States Patent
Bruchhaus et al.

[11] Patent Number: 6,108,191
[45] Date of Patent: Aug. 22, 2000

[54] MULTILAYER CAPACITOR WITH HIGH SPECIFIC CAPACITANCE AND PRODUCTION PROCESS THEREFOR

[75] Inventors: Rainer Bruchhaus, München; Dana Pitzer, Unterschleissheim; Robert Primig; Wolfram Wersing, both of München; Wolfgang Hönlein, Unterhaching, all of Germany

[73] Assignee: Siemens Aktiengesellschaft, Munich, Germany

[21] Appl. No.: 09/197,888

[22] Filed: Nov. 23, 1998

Related U.S. Application Data

[63] Continuation of application No. PCT/DE97/00914, May 5, 1997, abandoned.

[30] Foreign Application Priority Data

May 21, 1996 [DE] Germany .................. 196 20 434

[51] Int. Cl.$^7$ .................. H01G 4/228; H01G 4/06
[52] U.S. Cl. .................. 361/306.3; 361/312; 361/321.2; 257/295
[58] Field of Search .................. 361/303, 305, 361/306.1, 306.3, 309, 311–313, 321.1, 321.2, 321.3, 321.4, 321.5; 29/25.42; 257/295, 532, 310; 501/134, 136, 137; 252/62.9 R, 62.9 PZ

[56] References Cited

U.S. PATENT DOCUMENTS

| | | | |
|---|---|---|---|
| 3,210,607 | 10/1965 | Flanagan | 361/103 |
| 4,219,866 | 8/1980 | Maher | 361/321.4 |
| 5,036,424 | 7/1991 | Yokotani et al. | 361/321.4 |
| 5,036,425 | 7/1991 | Omori et al. | 361/321.4 |
| 5,117,326 | 5/1992 | Sano et al. | 361/321.4 |
| 5,561,587 | 10/1996 | Sanada | 361/306.1 |
| 5,668,694 | 9/1997 | Sato et al. | 361/321.4 |
| 5,905,049 | 5/1999 | Matoba | 501/134 |

FOREIGN PATENT DOCUMENTS

| | | |
|---|---|---|
| 0298811A1 | 1/1989 | European Pat. Off. . |
| 0617440A2 | 9/1994 | European Pat. Off. . |
| 0664548A2 | 7/1995 | European Pat. Off. . |
| 3442790A1 | 6/1985 | Germany . |
| 4300808C1 | 3/1994 | Germany . |

OTHER PUBLICATIONS

Japanese Patent Abstract No. 07336118 (Kobayashi et al.), dated Dec. 22, 1995.

Japanese Patent Abstract No. 07142288 (Tomoyuki), dated Jun. 2, 1995.

Japanese Patent Abstract No. 08078283 (Yumi et al.), dated Mar. 22, 1996.

"Electronic Conduction Characteristics of Sol–Gel Ferroelectric $Pb(Zr_{0.4}Ti_{0.6})O_3$ Thin–Film Capacitors: Part I", Takashi Mihara et al., Jpn. J. Appl. Phys. vol. 34, Oct. 1995, pp. 5664–5673.

*Primary Examiner*—Dean A. Reichard
*Assistant Examiner*—Anthony Dinkins
*Attorney, Agent, or Firm*—Herbert L. Lerner; Laurence A. Greenberg; Werner H. Stemer

[57] ABSTRACT

A thin-film technology multi-layer capacitor with enhanced capacitance and/or reduced space requirement. The dielectric layers of which are alternately disposed between electrode layers on a substrate. Through alternate electrode layer connections, parallel interconnection of the individual capacitor layers is obtained. The result is that the individual capacitances are additive, while the temperature response can be optimized by a suitable choice or combination of different dielectric layers.

9 Claims, 4 Drawing Sheets

MIXED CRYSTAL SYSTEM $(Ba_{1-u}Sr_u)TiO_3(BST)$

MULTILAYER CAPACITOR WITH HIGH SPECIFIC CAPACITANCE AND PRODUCTION PROCESS THEREFOR

CROSS-REFERENCE TO RELATED APPLICATION

This is a continuation of copending International Application PCT/DE97/00914, filed May 5, 1997 now abandoned, which designated the United States.

BACKGROUND OF THE INVENTION

1. Field of the Invention

Known multi-layer capacitors are ceramic components in which electrode layers and thin ceramic layers are alternately disposed over one another. Every ceramic layer, with the two neighboring electrode layers form an individual capacitor. The individual capacitors are electrically connected in parallel by corresponding connections of the electrode layers. In order to produce ceramic multi-layer capacitors of this type "wet" processes are used, for example green sheets are produced using a slip or a Sol-gel process and then have the electrode material printed on them. By stacking such printed green sheets on one another, and sintering them together, compact components are obtained which, in a final process step, are additionally provided with electrical terminals. In order to increase the capacitance of such ceramic multi-layered capacitors, it is possible to increase the number of individual capacitors, that is to say the number of layers in the multi-layer capacitor. However, it is not possible to produce multi-layer capacitors with high capacitance, in the region of a few uF, in this way except with great technological outlay.

Although electrolytic capacitors, already currently available, can be produced with such high capacitances in the region of a few uF, they often have unsatisfactory electrical properties. In particular, electrolytic capacitors leave scope for improvement in terms of frequency response, switched-current response (internal resistance), leakage current and the temperature range in which they can be used. Further, it is not possible to produce extremely flat structures, as required in particular for SMD technology, when using electrolytic capacitors.

SUMMARY OF THE INVENTION

It is accordingly an object of the invention to provide a multi-layer capacitor with high specific capacitance and production process therefore which overcome the above-mentioned disadvantages of the prior art devices and methods of this general type, which capacitors can be produced in a flat structure, whose production outlay is reduced in comparison with known multi-layer capacitors, and whose electrical properties are improved in comparison with electrolytic capacitors.

With the foregoing and other objects in view there is provided, in accordance with the invention, a thin-film technology multi-layer capacitor, including: a substrate; n+1 electrode layers and n dielectric ceramic layers having a maximum layer thickness of 2 mm are alternately disposed on the substrate where n satisfies the equation 1<n<100, the electrode layers and the dielectric ceramic layers form a layer structure having opposite sides and a plane; a first contact layer is disposed on one of the opposite sides of the layer structure; a second contact layer is disposed on another one of the opposite sides of the layer structure separate from the first contact layer, the first contact layer and the second contact layer are disposed substantially perpendicular to the plane of the layer structure; and the electrode layers are alternately electrically connected to the first contact layer and to the second contact layer, respectively.

According to the invention, the multi-layer capacitor includes a multi-layer structure which is disposed on a substrate and in which electrode and dielectric layers are alternately disposed above one another, each in the form of a thin film. The electrode layers are alternately connected to a first and a second contact layer, each of which is disposed along the side of the layer structure and approximately perpendicular to the layer plane. The number n of dielectric layers is chosen to be more than 1 and less than 100. It is preferably 5 to 20 layers.

Ceramic dielectric layers applied using conventional thin-film processes have a maximum layer thickness of about 1 mm. In comparison with many-layered capacitors produced using known wet ceramic methods, in which the dielectric layers can at best be reduced to a thickness of about 5 mm, this results in a reduction in the layer thickness by at least a factor of 5. However, since with known thin-film processes it is already currently possible to achieve small layer thicknesses of as little as 0.1 mm reliably and reproducibly, a reduction in the layer thickness by a factor of up to 50 is possible with the invention. Moreover, since the specific capacitance (=capacitance/volume) is inversely proportional to the square of the thickness of the dielectric layers, the specific capacitance can be increased with the invention, in comparison with the best known multi-layered capacitors, by a factor of up to 2500. Therefore, with the invention, material can be saved in comparison with known ceramic multi-layered capacitors, and a substantially flatter structure and a substantially smaller space requirement, for at least equal capacitance, can be achieved in comparison with all other known capacitors.

In an advantageous refinement of the invention, the electrode layers are alternately formed from two different electrode materials, which also have different oxidation potentials. The structure is particularly favorable for the production process, likewise according to the invention, for the multi-layer capacitor since it avoids elaborate photolithographic steps for structuring or connecting the electrode layers to the first and second contact layers.

In a further refinement of the invention, the dielectric layers of the multi-layer capacitor are formed from at least two different dielectric materials. In this way, it is possible for the electrical properties of the multi-layer capacitor to be matched exactly to a desired profile by choosing a plurality of suitable dielectric materials. For example, the temperature response or the temperature characteristic of the electrical values of the multi-layer capacitor or temperature sensitivity of the capacitor, can be adjusted. Besides the absolute value of the capacitance of the capacitor, the temperature response is of great importance in regards to the useability of the multi-layer capacitor as a component in electrical and electronic circuits. The invention opens up a further field of application for the multi-layer capacitors. It is thus possible to produce individual dielectric layers from a material that, just by itself, would give a poor temperature characteristic in a one-layer capacitor. It is only the temperature characteristic of the overall multi-layer capacitor which is of essential importance, and this is obtained as an average with the parallel interconnection according to the invention of single-layer capacitors in the layer structure. Through suitable combination, a temperature response with minimal changes in the electrical values in the multi-layer capacitor can be formed as a combination of individual dielectric layers which, in a given temperature range, have a large change in their electrical values. Particularly high capacitances are obtained if the dielectric layers are paraelectric layers, that is to say include ferroelectric materials. The particularly unfavorable temperature response of individual ferroelectric or paraelectric layers in one-layer capacitors is compensated for particularly advantageously in the multi-layer capacitor according to the invention, as has just been described. At the Curie temperature, ferroelectric layers exhibit a transition from ferroelectric to paraelectric behavior. In a capacitor, this causes an extreme change in the electrical properties at the Curie temperature. For a multi-layer capacitor according to the invention, made from ferroelectric layers, a suitable layer structure therefore has a plurality of ferroelectric materials whose Curie temperatures are uniformly distributed over the temperature range desired for an application.

The thin-film processes with which the ferroelectric or dielectric layers of the multi-layer capacitor are produced allow a straightforward variation of the composition in the components that have a dominant effect on the properties. Using multi-target sputtering, in particular, the composition of the growing dielectric or ferroelectric layers can be varied in simple fashion from layer to layer by changing the target, covering target surfaces or, more elegantly, by changing the power at the target.

In principle, the dielectric materials suitable for the dielectric layers are all those which can be produced using thin-film processes and whose dielectric properties give the desired overall properties in the multi-layer capacitor on account of known conformance to laws and dependencies. What is of primary importance for the functional capability of the multi-layer capacitor is the breakdown strength at the given layer thickness in relation to a desired working voltage. A further requirement is for deposition with sufficient uniformity so as ensure uniformity from layer to layer in the layer structure. Nonuniformities could entail higher leakage currents and therefore restricted use of the multi-layer capacitor. Corresponding materials have already been employed in conventional ceramic multi-layer capacitors. In this regard, only C0G compositions based on the ceramic systems $BaNd_2Ti_4O_{12}$, $BaLa_2Ti4O_{12}$ or $Zr(Sn, Ti)O_4$, and compositions for the capacitor standard XR7 based on $BaTiO_3$ or compositions for the standard Z5U based on relaxor ferroelectrics, such as for example $Pb(Mg_{1/3}Nb_{2/3})O_3$ (=PMN) mentioned. The structure according to the invention has the further advantage that even such dielectric materials as would in themselves be unsuitable in a one-layer capacitor may, however, be used in the multi-layer capacitor according to the invention to round off its properties.

Combinations of the material system $(Ba_{1-u}Sr_u)TiO_3$, of the system $Ba(Ti_{1-x}Zr_x)O_3$ or of relaxor systems such as, for example, $Pb[Ti_{1-x}(Mg_{1/3}Ta_{2/3})_x]O_3$ are suitable for the ferroelectric layers. With these materials, standardized temperature characteristics such as, for example, X7R or Z5U according to the CIA standard are possible. All customary deposition methods such as MOD, Sol-gel, MOCVD or sputtering are possible for these materials.

The electrode layers include electrode materials that can withstand the relatively high process temperatures of up to about 600° C. without suffering damage. Suitable materials include, for example, platinum, iridium, ruthenium, $RuO_2$, $SrRuO_3$ or $(LaSr)CoO_3$. The electrode layers too are produced using thin-film processes such as, for example, CVD or by sputtering. Electron-beam evaporation is also suitable. From the electrode materials indicated, pairs with different oxidation potentials may be formed, as are required in the production process according to the invention. The electrode materials consisting of ceramic compounds have the advantage that the oxidation potential can be adjusted for them particularly readily by varying their composition.

With the foregoing and other objects in view there is also provided, in accordance with the invention, a process for producing a multi-layer capacitor, which includes: a) applying an electrode layer to a substrate; b) applying a dielectric layer to the electrode layer; c) applying another electrode layer, made of a different material than the electrode layer, to the dielectric layer; d) repeating steps b) and c) until a desired number of n, where n is 1<n<100, dielectric layers has been reached with the electrode layers being alternately made of a first electrode material with a higher oxidation potential and a second electrode material with a lower oxidation potential, the dielectric layers and the electrode layers defining a layer structure having a first side face and a second side face substantially perpendicular to a plane of the layer structure; e) selectively removing on the first side face of the layer structure produced on the substrate a part of the second electrode material with the lower oxidation potential for forming indentations; f) filling in the indentations with insulation material; g) applying a contact layer to the first side face for electrically connecting all the electrode layers made of the second electrode material to one another; h) selectively removing on the second side face of the layer structure, separate from the first side face, part of the first electrode material with the higher oxidation potential for forming further indentations; i) filling in the further indentations with the insulation material; and j) applying another contact layer to the second side face for electrically connecting all the electrode layers made of the first electrode material to one another.

In accordance with an added feature of the invention, there is the step of depositing currentlessly a further electrode material over the electrode layers with the higher oxidation potential in an electrolyte bath, the second electrode material with the lower oxidation potential acting as a sacrificial cathode and is partly removed by the electrolyte bath during the selectively removing part of the second electrode material step.

In accordance with a concomitant feature of the invention, there are the steps of: providing the substrate with a large surface area; sectioning the substrate into capacitor rows in a form of strips after process step d); stacking a plurality of the capacitor rows above one another in a direction of the layer structure for forming a stack; carrying out process steps e) to j) simultaneously in the stack on the plurality of capacitor rows; and separating the plurality of capacitor rows from one another and further dividing the plurality of capacitor rows into individual multi-layer capacitors.

Other features which are considered as characteristic for the invention are set forth in the appended claims.

Although the invention is illustrated and described herein as embodied in a multi-layer capacitor with high specific capacitance and production process therefore, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
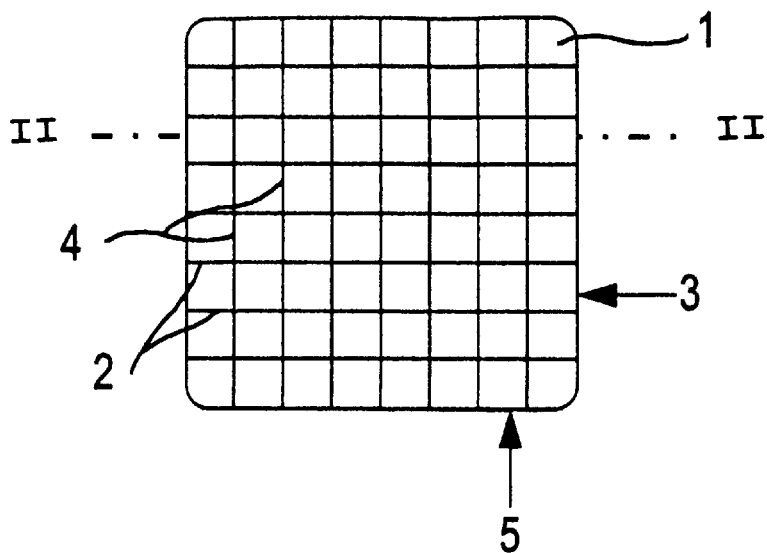
FIG. 1 is a diagrammatic plan view of a substrate according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown an inexpensive substrate 1, for example $Al_2O_3$, silicon or glass, is preferably used. Metal substrates are also possible. The substrate 1 is coated with a conventional adhesion layer 6 that ensures both uniform growth of a first electrode layer E1 and good adhesion of the latter. An example of the adhesion layer 6 for glass is titanium dioxide $TiO_2$.

The multi-layer capacitor is preferably produced on the substrate 1 that has a large area. To assist in the subsequent sectioning into individual capacitors with the desired basic area, the substrate 1 is formed with a trench pattern made of grooves or furrows. By way of example, FIG. 1 represents such a pattern made up of horizontal trenches 2 and vertical trenches 4 that divide the substrate surface into rows 3 and columns 5. Substrates with standard formats, for example with the 8" application, which are highly suitable for conventional thin-film deposition devices are advantageously used.

Figure 2:
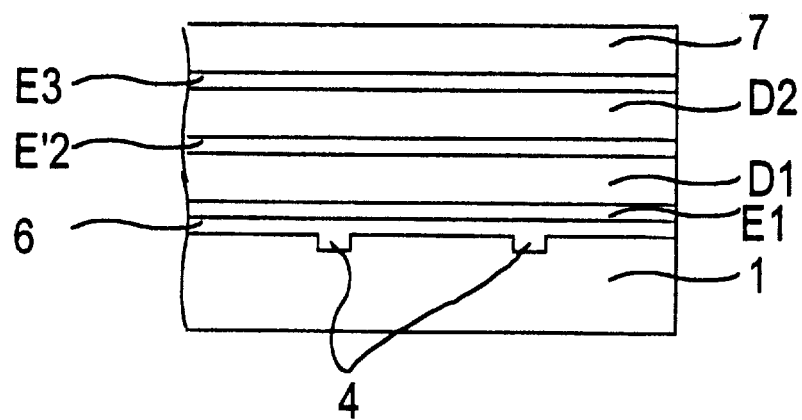
FIG. 2 is a sectional view of a layer structure.

FIG. 2 shows the full layer structure by way of a schematic cross section view (see the line II—II in FIG. 1) through the substrate 1 parallel to the horizontal trenches 2. A layer structure with the first electrode layer E1 made of an electrode material with a first oxidation potential is represented. The first electrode layer E1 is preferably made of such an electrode material as adheres well to the substrate 1 or to the adhesion layer 6 and can further be deposited uniformly and with a maximally plane and smooth surface. One example of a highly suitable material for the first electrode layer E1 is platinum.

On top of this, a first dielectric layer D1 is deposited, for example also using a thin-film process. A second electrode layer E'2, made of a second electrode material which has a second oxidation potential that is lower than the oxidation potential of the first electrode layer E1 follows next. Highly suitable combinations with the first electrode E1 are formed, for example, by IR or $(LaSr)CoO_3$. The further layers which follow are a second dielectric layer D2 which is made of the same material as the first dielectric layer D1 or is different therefrom. On top of this, a third electrode layer E3 is produced which in turn is made of the first electrode material with a first oxidation potential.

In a layer structure consisting of more than two dielectric layers, further dielectric layers D and electrode layers E and E' are disposed above one another in corresponding alternating succession. The upper limit for the number n of dielectric layers is, on the one hand, the uniformity that may deteriorate and, on the other hand, the increased process outlay that is not least reflected in the costs.

The final layer on the layer structure is a protective layer 7 that, in the illustrative embodiment consists of a dielectric material.

Next, the substrate 1 with the layer structure applied on top of it is sectioned along the horizontal trenches 2 into capacitor rows 3. The erosion method involving ion beam etching may be used for sectioning the layer structure. On the other hand, the substrate may be sawed or fractured along the vertical trenches 4.

Figure 3:
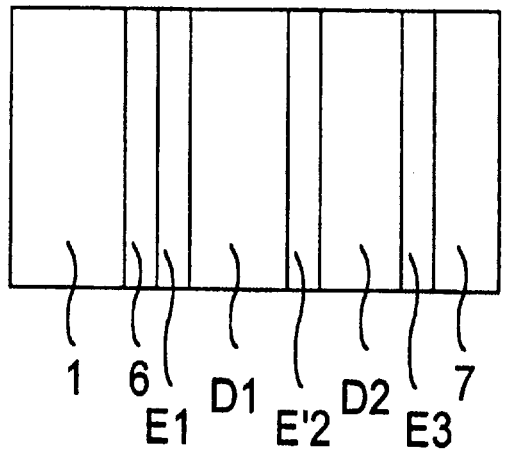
FIGS. 3 to 9 are sectional views rotated 90° showing various process stages for the production of electrical interconnections.

FIG. 3 shows a further schematic cross section through the layer structure. The face pointing upward in the figure represents the side face of the layer structure from FIG. 2.

Figure 4A:
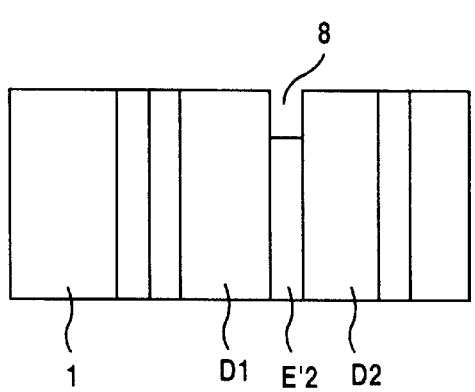

In the next step, the electrode material of the electrode layers E' with the lower oxidation potential is then selectively removed from the surface (=side face of the layer structure). Because of the different oxidation potential of the two electrode materials, the selective removal of a part of the electrode E' with the lower oxidation potential is achieved by simple wet chemical etching with a correspondingly strong etchant. FIG. 4a shows the layer structure after the etching step during which, by removing a part of the electrode E'2, an indentation 8 in the side face is created.

Figure 4B:
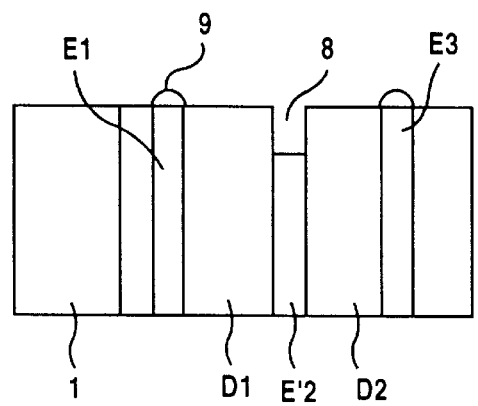

As an alternative method for selective etching, the side face may be treated in an electrolyte that additionally contains metal ions (for example the electrode material with higher oxidation potential). In this case through a corresponding redox process, the electrode material with the lower oxidation potential enters solution, while metal deposition 9 takes place over the electrode material with the higher oxidation potential. FIG. 4b shows the layer structure after this step.

Figure 5A:
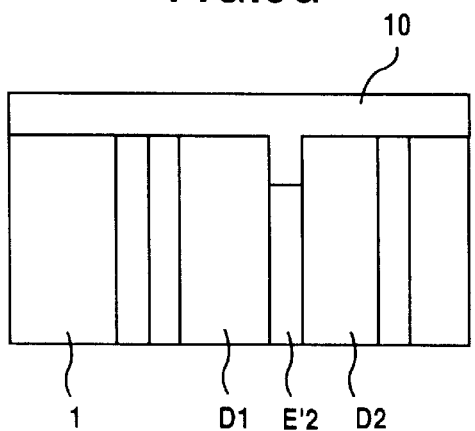
Figure 5B:
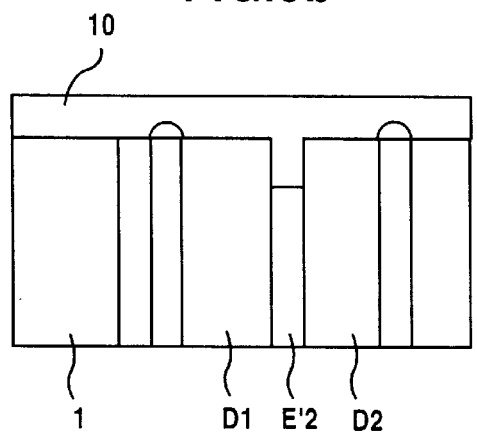
Figure 6:
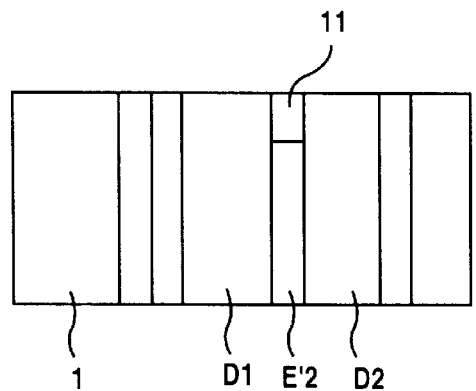
Figure 7:
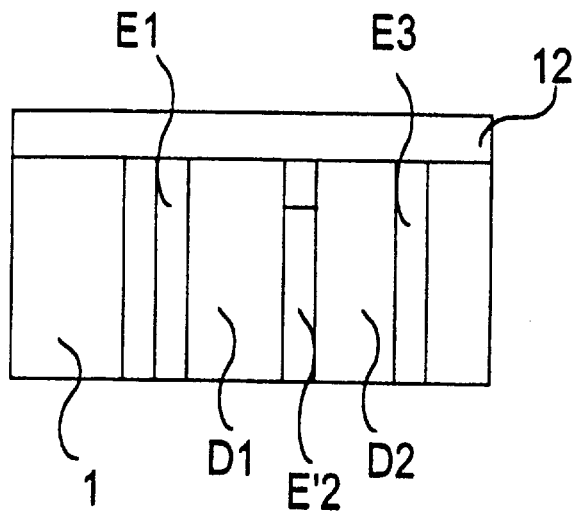

Next, the indentation 8 is filled with insulation material in order to insulate the partly etched electrode layers E'2 against a future electrical contact. To this end, an insulation layer 10 which fills the indentation 8 is preferably deposited surface-wide on the side face. FIGS. 5a and 5b show the layer structure after this step.

By uniform erosion of the insulation layer 10 parallel to the surface (side face), for example by chemical-mechanical polishing (CMP), the electrode layers E1 and E3 with the higher oxidation potential are exposed. The electrode layer E'2 with the lower oxidation potential is then covered in the indentation 8 with a strip 11 of insulation material, and therefore electrically insulated.

In order to connect the electrode layers E1 and E3, a first contact layer 12 is then applied to the surface. The contact layer 12 may include an adhesion layer, made of chromium and/or nickel, a sputtered diffusion barrier layer made of platinum and such other electrode layers (for example made of gold) which allow connection by soldering.

Figure 8:
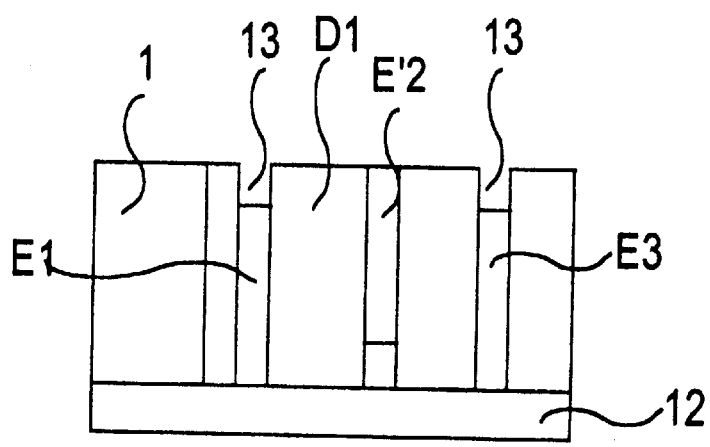
Figure 9:
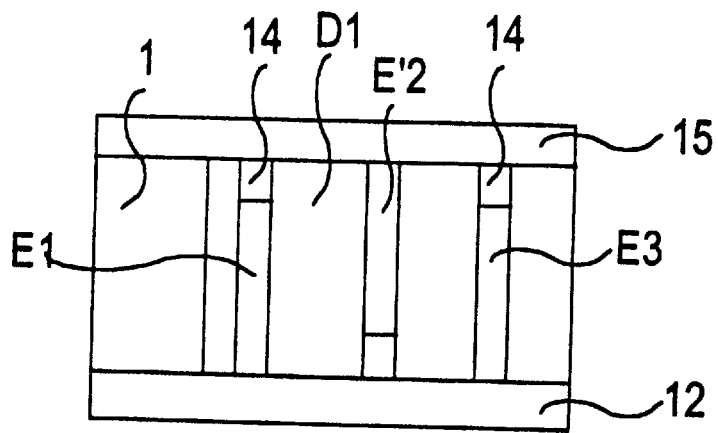

In the next step, part of the electrode material is removed from the electrode layers E1 and E3 on the side face on the opposite side from the contact face 12. This is done by anodically assisted electrochemical etching, in which the contact layer 12 is connected to the anode in an electrolytic etching bath. FIG. 8 shows the structure layer after the electrolytic etching. By removing the electrode material of the electrode layers E1 and E3 from the surface, indentations 13 are created.

In a similar way, the indentations 13 are then likewise filled with insulation material 14, the surface of the electrode layer E'2 is exposed by chemical-mechanical polishing and electrically connected to a second contact layer 15 deposited on top.

The process steps described with reference to FIGS. 3 to 9 may advantageously be carried out at the same time for a plurality of capacitor rows 3. Preferably, a plurality of capacitor rows are to this end stacked above one another in such a way that all the side faces of the capacitor rows together form a common surface. The capacitor rows 3 are then sectioned into the individual multi-layer capacitors with the desired basic area by sectioning along the trenches 4.

Figure 10:
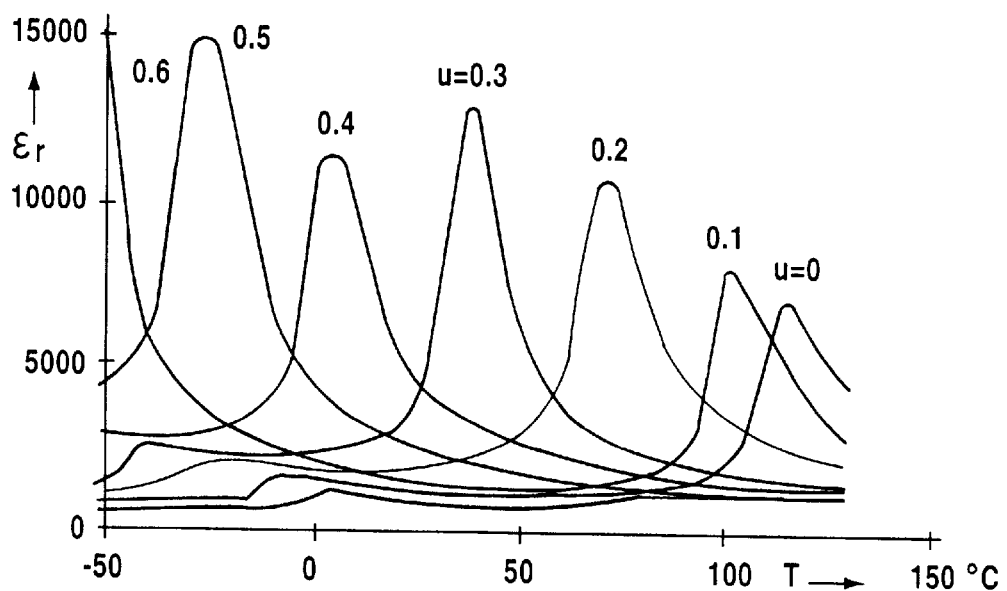
FIG. 10 is a graph of temperature sensitivities for various ceramic compositions.

In the production of a multi-layer capacitor with a temperature sensitivity X7R, a multi-layer capacitor with the temperature sensitivity X7R according to the CIA standard can be produced with a layer structure whose dielectric layers D are made of the material system $(Ba_{1-u}Sr_u)TiO_3$(= BST), or of the system $Ba(Ti_{1-x}Zr_x)O_3$ or of relaxor systems such as, for example $Pb[Ti_{1-x}(Mg_{1/3}Nb_{2/3})_x]O_3$. By varying the composition, that is to say by varying the parameters u or x, a plurality of different dielectric layers D1 to Dn are produced in the layer structure. The material composition of the different dielectric layers is in this case chosen in such a way that the critical temperature ranges of the individual dielectric layers are distributed as uniformly as possible over the relevant temperature range in which the multi-layer capacitor is by definition to exhibit the desired temperature response X7R. With reference to the BST system $(Ba_{1-u}Sr_u)TiO_3$, FIG. 10 shows how the temperature sensitivity of the value $\epsilon r$ can be varied by varying the parameter u over a temperature range of more than 160° C. To represent this, seven measurement curves for different parameters u are given, the maxima of which are distributed uniformly over the shown temperature range from −50 to +110° C. The figure is intended merely by way of example to show that it is possible for the maxima to be distributed uniformly. Suitable compositions for the desired standard X7R can also be achieved with BST compositions with a different barium/strontium ratio or other physical systems.

For fine tuning, it is also possible to use different compositions or physical systems in the multi-layer capacitor, but it is also possible for a plurality of layers to have the same composition. The critical temperature range for an individual dielectric layer D is in this case the range in which the greatest relative variations in property occur. For ferroelectric layers, this critical range is a sharply defined temperature range around the Curie temperature, while for relaxor systems it is a relatively broader range around the point of the ferroelectric phase transition. The temperature response of the complete multi-layer capacitor is, so to speak, given as an average or by superposition of the corresponding temperature profiles of the individual dielectric layers, and can thus be adjusted to the desired specifications for X7R.

Figure 11:
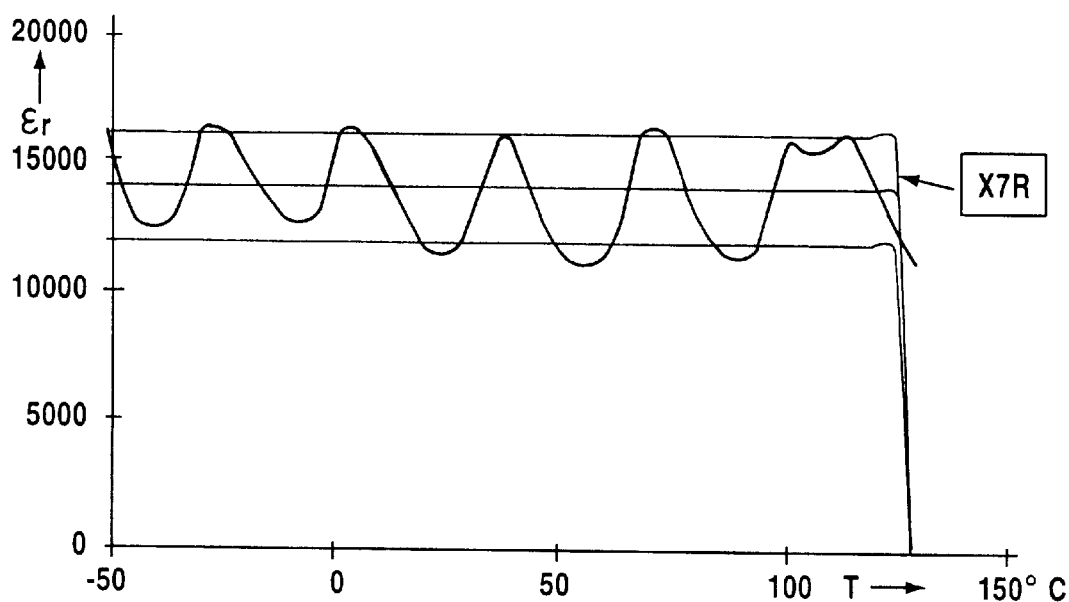
FIG. 11 is a graph of the temperature sensitivity of a multi-layer capacitor according to the invention.

FIG. 11 shows the temperature sensitivity of a multi-layer capacitor according to the invention that meets the X7R standard. Although the measurement curve for the temperature sensitivity still has the maxima which correspond to the maxima of the measurement curves for the individual layers, only a small deviation from the average is observed overall, as required by the standard. Between −55° and +125° C., the relative capacitance variations ΔC/C of the multi-layer capacitor may for this purpose reach values of ±15 percent.

In the production of a multi-layer capacitor with the temperature sensitivity Y5V, a multi-layer capacitor with the temperature sensitivity Y5V can be produced in a straightforward way from relaxor materials, it being possible for all the dielectric layers D to be made of the same relaxor material. To this end, the relaxor system specified in the previous illustrative embodiment may be employed. In order to satisfy the required temperature sensitivity, the dielectric layers D may also be produced from different relaxor materials in order, for example, to obtain a Z5V characteristic instead of the Y5V characteristic of the aforementioned system PMN-PT. The relative capacitance variations ΔC/C of the multi-layer capacitor required for the standard should for Y5V be at most +22%/−82% in the interval from −30° to +85°, and for Z5V +22%/−56% in the interval from +10° to 85° C.

In the production of a multi-layer capacitor with the temperature sensitivity C0G, the temperature sensitivity C0G can be produced according to the invention with a multi-layer capacitor whose layer structure essentially includes dielectric layers D with low permittivity $\epsilon r$. These are, in particular, non-ferroelectric materials. A suitable material system for meeting this standard is, for example, $(Sn, Zr)TiO_4$ with $\epsilon r$ approximately equal to 40. By varying the Sn/Zr cation ratio, it is also possible here to combine dielectric layers with different temperature response, which in the overall multi-layer capacitor result in an extremely uniform temperature sensitivity with only small relative and absolute property variations. The temperature sensitivity tolerances may, if desired, be adjusted even better here than required by the C0G standard. For the C0G standard, the temperature coefficient must satisfy $$TC\varepsilon = \frac{d\varepsilon}{\varepsilon dT} = 0 \pm 30 ppm/K$$

over the entire operating temperature range of the capacitor.

The multi-layer capacitor according to the invention may, with very high capacitance, serve as a replacement for electrolytic capacitors. As an alternative, it may be used as a capacitor with low space requirement or with low overall height, for example for integration in chip packages or for incorporation in contactless smart cards. In comparison with conventional ceramic multi-layer capacitors it has, for a comparable number of layers, typically 100 times higher specific capacitance. Per square millimeter of area of a dielectric layer with $\epsilon$=500, capacitances of about 10 nF can typically be achieved. With increasing $\epsilon$, this value becomes correspondingly higher.

What is claimed is:

1. A thin-film technology multi-layer capacitor, comprising:

a substrate;

n+1 electrode layers and n dielectric ceramic layers having a maximum layer thickness of 2 mm alternately disposed on said substrate where n satisfies the equation 1<n<100, said electrode layers and said dielectric ceramic layers forming a layer structure having opposite sides and a plane;

a first contact layer disposed on one of said opposite sides of said layer structure;

a second contact layer disposed on another one of said opposite sides of said layer structure separate from said first contact layer, said first contact layer and said second contact layer being disposed substantially perpendicular to said plane of said layer structure; and said electrode layers being alternately electrically connected to said first contact layer and to said second contact layer, respectively;

said electrode layers including first electrode layers connected to said first contact layer and second electrode layers being connected to said second contact layer, said first electrode layers formed of a given electrode material having a given oxidation potential, said second electrode layers being formed of an electrode material having an oxidation potential different than said given electrode material and said given oxidation potential of said first electrode layers.

2. The multi-layer capacitor according to claim 1, wherein each of said dielectric ceramic layers is formed of a uniform dielectric material and each of said dielectric ceramic layers is formed of one of at least two different dielectric materials.

3. The multi-layer capacitor according to claim 1, wherein said dielectric ceramic layers include ferroelectric layers.

4. The multi-layer capacitor according to claim 3, wherein said layer structure includes different ferroelectric layers having different temperature responses, said different ferroelectric layers selected such that a desired overall temperature response of said layer structure is obtained by averaging.

5. The multi-layer capacitor according to claim 1, wherein n is determined from an equation $5 \leq n \leq 20$.

6. A thin-film technology multi-layer capacitor, comprising:

a substrate;

n+1 electrode layers and n dielectric ceramic layers having a maximum layer thickness of 2 mm alternately disposed on said substrate where n satisfies the equation $1 < n < 100$, said electrode layers and said dielectric ceramic layers forming a layer structure having opposite sides and a plane, each of said dielectric ceramic layers is formed of a uniform dielectric material and each of said dielectric ceramic layers is formed of one of at least two different dielectric materials;

a first contact layer disposed on one of said opposite sides of said layer structure;

a second contact layer disposed on another one of said opposite sides of said layer structure separate from said first contact layer, said first contact layer and said second contact layer disposed substantially perpendicular to said plane of said layer structure; and said electrode layers alternately electrically connected to said first contact layer and to said second contact layer, respectively.

7. The multi-layer capacitor according to claim 6, wherein said dielectric ceramic layers include ferroelectric layers.

8. The multi-layer capacitor according to claim 7, wherein said layer structure includes different ferroelectric layers having different temperature responses, said different ferroelectric layers selected such that a desired overall temperature response of said layer structure is obtained by averaging.

9. The multi-layer capacitor according to claim 6, wherein n is determined from an equation $5 \leq n \leq 20$.

* * * * *